(12) United States Patent
Menard et al.

(10) Patent No.: US 10,479,320 B2
(45) Date of Patent: Nov. 19, 2019

(54) METHOD FOR CONTROLLING ACCESS TO AT LEAST ONE FUNCTION OF A MOTOR VEHICLE

(71) Applicant: VALEO COMFORT AND DRIVING ASSISTANCE, Créteil (FR)

(72) Inventors: Eric Menard, Créteil (FR); Jérome Baumann, Créteil (FR); Fabienne Masson, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 218 days.

(21) Appl. No.: 15/532,393

(22) PCT Filed: Dec. 22, 2015

(86) PCT No.: PCT/FR2015/053721
§ 371 (c)(1),
(2) Date: Jun. 1, 2017

(87) PCT Pub. No.: WO2016/102889
PCT Pub. Date: Jun. 30, 2016

(65) Prior Publication Data
US 2017/0334394 A1 Nov. 23, 2017

(30) Foreign Application Priority Data
Dec. 23, 2014 (FR) ..................................... 14 02999

(51) Int. Cl.
*B60R 25/24* (2013.01)
*G07C 9/00* (2006.01)
(Continued)

(52) U.S. Cl.
CPC .......... *B60R 25/24* (2013.01); *F02N 11/0807* (2013.01); *G05B 15/02* (2013.01);
(Continued)

(58) Field of Classification Search
CPC .............. B60R 25/24; B60R 2325/101; B60R 2325/205; F02N 11/0807; G05B 15/02; G07C 9/00309
See application file for complete search history.

(56) References Cited

U.S. PATENT DOCUMENTS

2004/0066092 A1 4/2004 Muller
2005/0285724 A1 12/2005 Schmidt et al.
(Continued)

OTHER PUBLICATIONS

International Search Report issued in PCT/FR2015/053721 dated Apr. 4, 2016 (3 pages).
(Continued)

*Primary Examiner* — Behrang Badii
*Assistant Examiner* — Daniel L Greene
(74) *Attorney, Agent, or Firm* — Osha Liang LLP

(57) ABSTRACT

The invention relates to a method for controlling access to at least one function of a motor vehicle (10), comprising: —an action step during which an electronic control unit (11) on board the motor vehicle detects an interaction of a user with the motor vehicle, —a verification step during which the electronic control unit verifies that the user is authorized to access said function, and —an authorization step during which the electronic control unit authorises access to said function. According to the invention, said verification step comprises sending of a query message by said electronic control unit to a mobile terminal (20) carried by the user or by a person accompanying the user, and said authorisation step is only implemented if, in response to the query message, the electronic control unit receives an access-right validation message from the mobile terminal.

15 Claims, 2 Drawing Sheets

(51) Int. Cl.
*F02N 11/08* (2006.01)
*G05B 15/02* (2006.01)
*H04L 29/06* (2006.01)

(52) U.S. Cl.
CPC .... *G07C 9/00309* (2013.01); *B60R 2325/101* (2013.01); *B60R 2325/205* (2013.01); *G07C 2009/00793* (2013.01); *G07C 2209/65* (2013.01); *H04L 63/0876* (2013.01)

(56) References Cited

U.S. PATENT DOCUMENTS

| | | |
|---|---|---|
| 2014/0049361 A1 | 2/2014 | Ahearn et al. |
| 2014/0181954 A1 | 6/2014 | Robertson et al. |
| 2014/0210592 A1 | 7/2014 | Van Wiemeersch |
| 2015/0264048 A1* | 9/2015 | Shirai .................. H04L 63/083 726/7 |
| 2015/0310680 A1* | 10/2015 | Lablans ............. G07C 9/00007 340/5.61 |
| 2016/0029190 A1* | 1/2016 | Rattner ................ H04W 76/10 455/414.4 |
| 2016/0125412 A1* | 5/2016 | Cannon ............. G06Q 20/4014 705/44 |
| 2016/0144826 A1* | 5/2016 | Nelson .................. B60R 25/241 701/2 |
| 2016/0180620 A1* | 6/2016 | Eyring ............... G07C 9/00031 235/382 |

OTHER PUBLICATIONS

Written Opinion of the International Searching Authority issued in PCT/FR2015/053721 dated Apr. 4, 2016 (7 pages).

\* cited by examiner

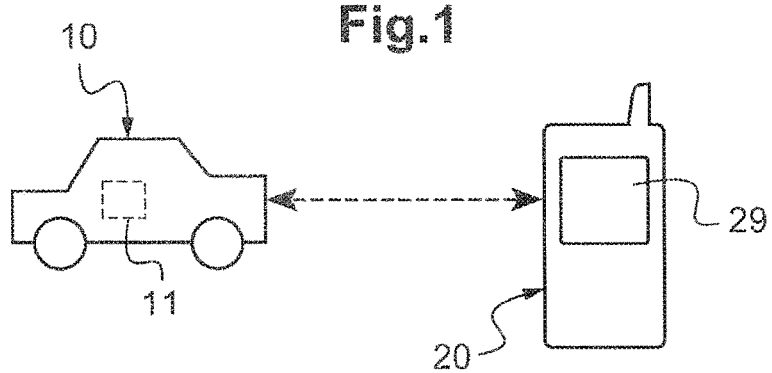
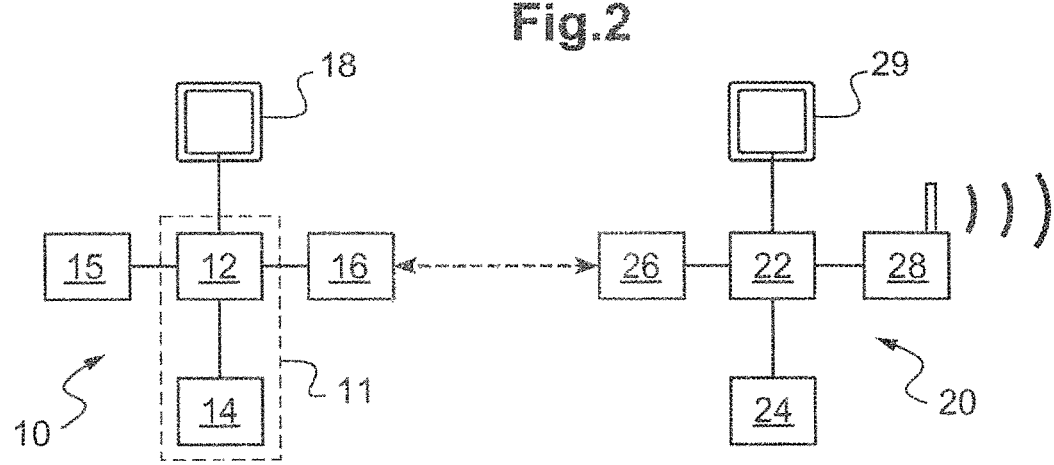

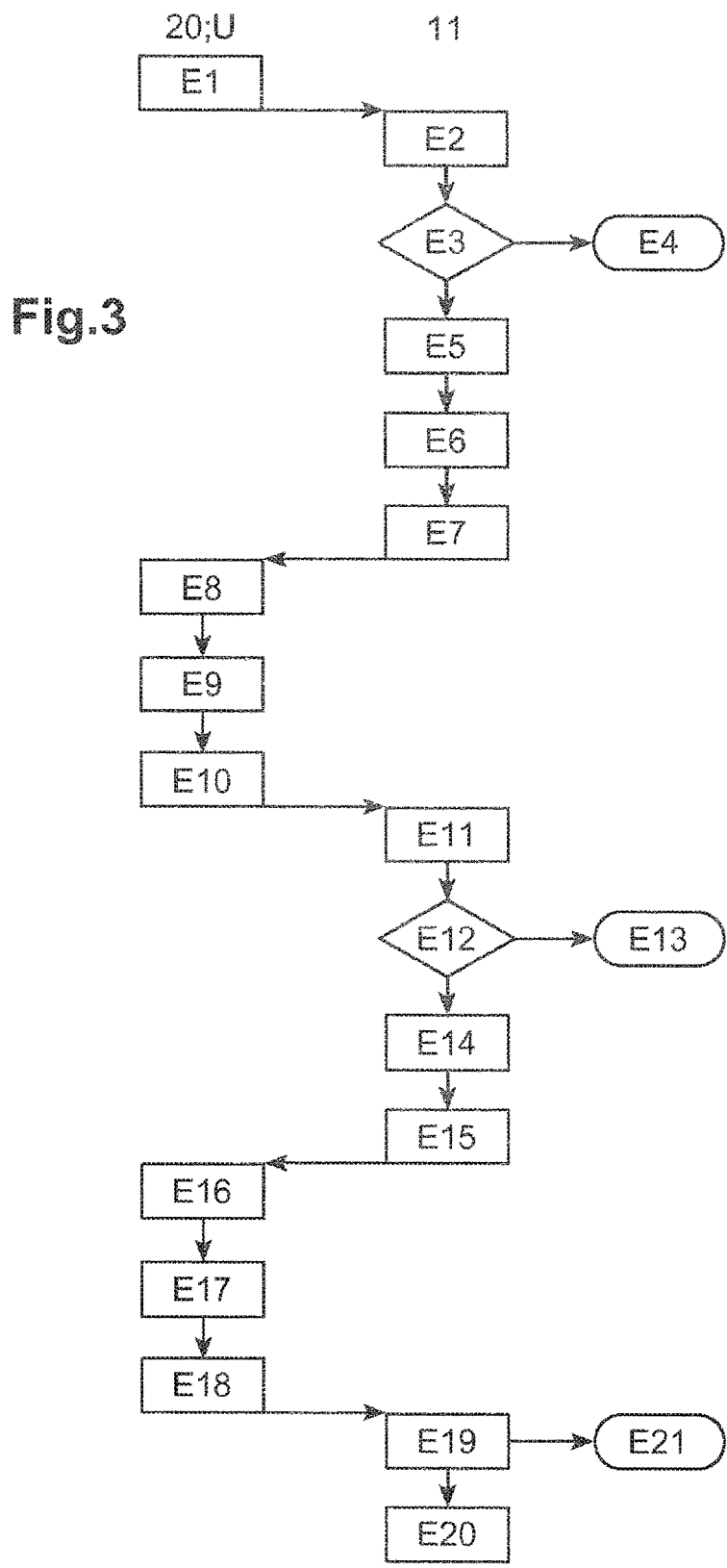

METHOD FOR CONTROLLING ACCESS TO AT LEAST ONE FUNCTION OF A MOTOR VEHICLE

TECHNICAL FIELD TO WHICH THE INVENTION RELATES

The present invention relates in a general way to the control of functions of a motor vehicle by means of a mobile terminal.

More particularly, it relates to a method for controlling access to at least one function of a motor vehicle, comprising:
- an action step in which an electronic control unit on board the motor vehicle detects an interaction of a user with the motor vehicle,
- a verification step in which the electronic control unit verifies that the user is authorized to access said function, and
- an authorization step in which, if the interaction is detected by the electronic control unit and the electronic control unit has verified that the user is authorized to access said function, the electronic control unit authorizes access to said function.

The invention may be applied in a particularly advantageous manner in the case where the function controlled is the unlocking of the doors of the vehicle or the starting of the vehicle.

PRIOR ART

There is a known way of controlling certain functions of a motor vehicle, such as unlocking the vehicle doors or starting the vehicle, by means of a remote controller in the form of a magnetic card acting as a contactless key.

The request for access to the functions of the motor vehicle is then initiated by an action, such as pressing a button on the magnetic card or touching one of the door handles of the motor vehicle, performed by the user.

When this access request is initiated, provision is made for the on-board electronic control unit in the vehicle to verify whether the carrier of the magnetic card is located in the immediate proximity of the motor vehicle.

For this purpose, the solution is to launch a magnetic card detection operation, using low frequency technology. The advantage of this low frequency technology is that it makes it possible to detect the magnetic card only if the card is in the immediate proximity of the vehicle (its range is less than two meters). Another advantage of this technology is that it allows the carrier of the magnetic card to be located either inside or outside the vehicle.

Thus, if the user moves away from his vehicle and a malicious person attempts to access it by touching one of the door handles, this access will be refused to him because of the distance between the vehicle and the magnetic card carrier.

The drawback of this solution is that the user has to be equipped with a card which is capable of communicating with the motor vehicle by low frequency technology. This is because most of the communication technologies in use (in cellphones, for example) have a range of more than 2 meters, making it impossible to verify with sufficient assurance whether the user is in the immediate proximity of the vehicle.

OBJECT OF THE INVENTION

The present invention proposes to allow access to the functions of the vehicle to a person equipped with a mobile terminal not having a low frequency communication means, without prejudice to the security of access to the vehicle.

More particularly, the invention proposes a control method as defined in the introduction, wherein:
- said verification step comprises the sending by said electronic control unit of an interrogation message to a mobile terminal carried by the user or by a person accompanying the user, and
- said authorization step is executed only if the electronic control unit receives an access right validation message from the mobile terminal in response to the interrogation message.

Consequently, any action undertaken by the user to obtain access to a function of the motor vehicle must be validated by the carrier of the mobile terminal.

Thus, because of the invention, it is possible to ensure that the person initiating the action is the person carrying the mobile terminal, or that he or she is authorized by the latter to access the function of the motor vehicle.

The solution proposed by the invention is therefore entirely secure, even if the mobile terminal does not necessarily include means enabling the motor vehicle to verify that the mobile terminal is in the immediate proximity of the vehicle.

Other advantageous and non-limiting characteristics of the control method according to the invention are as follows:
- before the interrogation message is sent, a step of authentication of the mobile terminal by the electronic control unit is provided, during which the electronic control unit interrogates the mobile terminal to verify that the mobile terminal carries a virtual key for access to the motor vehicle, and/or to verify that the mobile terminal is recorded in the electronic control unit as having a right to access the motor vehicle;
- before the interrogation message is sent, a checking step is provided, during which the electronic control unit checks whether the mobile terminal is located at a short or medium distance from the motor vehicle;
- in the checking step, the mobile terminal is considered to be at a short or medium distance from the motor vehicle if the electronic control unit detects the mobile terminal via a means of communication which is capable of communicating with the mobile terminal according to a medium or short range communications protocol;
- the interrogation message and the validation message are exchanged between the mobile terminal and the electronic control unit via means of communication capable of communicating with one another according to a medium or short range communications protocol;
- during said action step, the electronic control unit detects the entry of the mobile terminal into an area close to the motor vehicle, in which the mobile terminal and the electronic control unit are capable of communicating with one another via means of communication operating according to a medium or short range communications protocol;
- said communications protocol is Bluetooth;
- during said action step, the electronic control unit detects a pressure exerted by the user on a part of the motor vehicle;
- on receiving the interrogation message, the mobile terminal emits a sound or generates a vibration perceptible to said user or to said person accompanying the user;
- said authorization step comprises the transmission by said electronic control unit of a door unlocking signal or a vehicle starting signal;

said mobile terminal being a cellphone equipped with a display screen, during said verification step said interrogation message is directly transmitted by the electronic control unit to the cellphone in such a way that a message is displayed on the display screen of the cellphone, and during said authorization step said validation message is directly transmitted by the cellphone to the electronic control unit;

said mobile terminal being a mobile watch equipped with a display screen, during said verification step said interrogation message is directly transmitted by the electronic control unit to the mobile watch in such a way that a message is displayed on the display screen of the mobile watch, and during said authorization step said validation message is directly transmitted by the mobile watch to the electronic control unit;

said mobile terminal being a cellphone capable of communicating with a connected watch equipped with a display screen, during said verification step said interrogation message is directly transmitted by the electronic control unit to said connected watch via the cellphone in such a way that a message is displayed on the display screen of the connected watch;

during said authorization step, said validation message is directly transmitted by the connected watch to the electronic control unit; or during said authorization step, said validation message is transmitted by the connected watch to the electronic control unit via the cellphone.

DETAILED DESCRIPTION OF AN EXEMPLARY EMBODIMENT

The following description, referring to the attached drawings which are provided by way of non-limiting example, will make the nature and application of the invention clear.

FIG. 1 shows an example of a context in which the invention may be applied, comprising a motor vehicle and a mobile terminal;

FIG. 2 shows schematically components, useful for the understanding of the invention, of the motor vehicle and of the mobile terminal of FIG. 1; and FIG. 3 shows the main steps of a control method according to the invention.

FIG. 1 shows an example of a context in which the invention may be applied.

In this context, a motor vehicle 10 comprises an electronic control unit 11 (or ECU, for "Electronic Control Unit"), which is capable of controlling functions of the motor vehicle 10, and which may enter into communication, via a wireless link, with a mobile terminal 20.

The terminal may be a cellphone (or cellular telephone), preferably of the type known as an "intelligent phone", or "smartphone" according to the commonly used English term. It could equally well be a connected watch (associated with a cellphone), a mobile watch (which can communicate with other devices independently of any cellphone), a pair of connected spectacles, or other device.

The electronic control unit 11 is capable of communicating with this mobile terminal 20 in order to exchange data, for example in order to control functions of the motor vehicle 10 by means of the mobile terminal 20 (such a function may be, for example, unlocking the doors of the motor vehicle 10 or starting the engine of the motor vehicle 10), as explained below.

The wireless link used for communication between the electronic control unit 11 and the mobile terminal 20 operates by a technology other than a low frequency technology. Therefore it does not allow the electronic control unit 11 to determine precisely the distance between the motor vehicle 10 and the mobile terminal 20.

The wireless link used could be of any other type. It could, for example, use a Wi-Fi protocol (typically a protocol governed by the IEEE 802.11 standards) or a mobile telephony protocol of the 3G or 4G type.

In this case, however, and preferably, the wireless link used for communication between the electronic control unit 11 and the mobile terminal 20 is of the ultra high frequency type. More precisely, it is a Bluetooth link in this case.

The advantage of this technology, compared with the aforementioned technologies, is that it has a low energy consumption and its correct operation is not dependent on the correct operation of a global network architecture (typically, the architecture of the mobile telephony network).

FIG. 2 shows schematically components, useful for the understanding of the invention, of the motor vehicle 10 and of the mobile terminal 20.

It may be seen here that the motor vehicle 10 comprises, notably, the aforementioned electronic control unit 11, an actuator 15 (designed in this case for unlocking the doors of the motor vehicle 10), a wireless communication module 16, and a user interface 18.

The electronic control unit 11 comprises a processor 12 and a storage unit 14, for example a rewritable non-volatile memory or a hard disk.

The storage unit 14 stores, notably, computer programs comprising instructions whose execution by the processor 12 enables the electronic control unit 11 to execute the methods described below.

The storage unit 14 also stores data used in the context of the methods described below, notably a root key (or master key) $VK_0$ and a cryptographic function, denoted f below in this description, used as explained in the following text.

The root key $VK_0$ and the cryptographic function f are, for example, written to the storage unit 14 during the manufacture of the electronic control unit 11, before this electronic control unit 11 is installed in the motor vehicle 10.

The mobile terminal 20, in the form of a cellphone in this case, comprises un processor 22, a memory 24 (a rewritable non-volatile memory, for example), a wireless communication module 26, module 28 for communication on the mobile telephony network, and a user interface 29.

The wireless communication module 26 of the mobile terminal 20 enables a wireless link (of the aforementioned Bluetooth type in this case) to be established with the wireless communication module 16 of the motor vehicle 10, through which the processor 12 of the electronic control unit 11 and the processor 22 of the mobile terminal 20 can exchange data, notably as described below.

The memory 24 stores applications comprising instructions whose execution by the processor 22 enables the mobile terminal 20 to execute the method described below.

The memory 24 also stores data used in the context of the method described below.

The user interface 29 in this case takes the form of a touch screen, on which the user may enter information or press buttons in a conventional way. In a variant it could also take another form (for example, that of a keypad associated with a screen).

FIG. 3 shows the main steps of method for controlling access to at least one function of the motor vehicle 10, using the mobile terminal 20.

For greater clarity, in the remainder of the description, it will be assumed that the person carrying the mobile terminal 20 and wishing to access the function of the motor vehicle is the one and the same person, called the "user".

In a variant, provision could be made for the person wishing to access the function of the motor vehicle to be a different person from the mobile terminal carrier, in which case this person must be authorized by the mobile terminal carrier to access the function of the motor vehicle.

It will be assumed here that the desired function is that of unlocking the doors.

It will also be assumed that, before the execution of the control method, the mobile terminal 20 will have been specifically prepared for controlling the functions of the motor vehicle 10.

Thus it will be assumed that the mobile terminal 20 comprises a physical security element (SIM card, eSE module, or the like) in which are stored the cryptographic function f and a virtual key VK for accessing the motor vehicle 10.

It will also be assumed that the mobile terminal 20 has public derivation parameters DP embedded in its memory 24, together with a user application. The public derivation parameters DP are those which may be used to calculate the virtual key VK from the root key $VK_0$. For its part, the user application is designed to enable the user to communicate with the electronic control unit 11, as described in the following part of this description.

According to a particularly advantageous characteristic of the invention, the method for controlling access to the function of the motor vehicle comprises three main steps, including:
an action step in which the electronic control unit 11 detects an interaction of the user with the motor vehicle 10,
a verification step in which the electronic control unit 11 verifies that the user is authorized to access said function, by sending an interrogation message IM to the mobile terminal 20, and
an authorization step in which, if the electronic control unit 11 receives a validation message VM from the mobile terminal 20 in response to the interrogation message IM, the electronic control unit authorizes access to said function.

Preferably, these three steps are executed in this sequence.

The exchange of messages IM, VM between the electronic control unit 11 and the mobile terminal 20 enables the motor vehicle 10 to ensure, when it detects an interaction with a person, that the user does indeed wish to unlock the doors of the vehicle.

Thus, to illustrate this concept, we may initially consider the case in which the user is the owner of the motor vehicle and the carrier of the mobile terminal 20. In this case, when he interacts with the vehicle (for example by touching a door handle), the electronic control unit 11 sends to his mobile terminal 20 a message that he must validate to allow the door to be unlocked.

We may now consider the case in which the person interacting with the motor vehicle is not authorized to access it. In this case, when he interacts with the vehicle (for example by touching a door handle), the electronic control unit 11 sends, or attempts to send, to the mobile terminal 20 of the vehicle owner a message that the latter does not validate, and consequently the door remains locked.

The exchange of messages may be carried out using different means of communication. In this case, however, as mentioned above, the protocol used is of the Bluetooth type.

An exemplary embodiment of this control method is detailed in FIG. 3.

In this FIG. 3, step E2 represents the aforementioned action step, that is to say the step in which the electronic control unit 11 detects an interaction with the user U.

For its part, step E1 represents the interaction caused by the user U.

In this case, this interaction may take various forms.

It will be assumed here that this interaction is established when the user
U touches a part of the motor vehicle 10, for example a door handle of the vehicle which is equipped for this purpose with a detector connected to the electronic control unit 11.

In a variant, provision could be made for this interaction to be established when the user U, equipped with his mobile terminal 20, enters an area sufficiently close to the motor vehicle 10 to enable the electronic control unit 11 to detect and establish communication with the mobile terminal 20, via a Bluetooth link (in this case, step E3, described hereafter, will not be executed).

Other interactions (such as facial recognition of the user by means of a camera fitted to the vehicle) would also be feasible.

In any case, in step E2 the electronic control unit 11 detects this interaction.

Before sending a message to the user's mobile terminal 20, in this case the electronic control unit 11 proceeds to conduct various preliminary tests, which are not obligatory in the context of the present invention, but whose execution is preferable in order to provide the best security of access to the motor vehicle 10.

Thus, after the user has touched the door handle, a step E3 is provided, for checking the presence of the mobile terminal 20 at a short or medium distance from the motor vehicle 10.

This step will make it possible to avoid sending an interrogation message IM if the electronic control unit 11 does not detect the mobile terminal 20.

In this step, the electronic control unit 11 attempts to establish a Bluetooth link with the mobile terminal 20.

As explained above, this type of link has a short range (less than 10 meters) or a middle range (less than 100 meters) according to the Bluetooth technology used.

If no Bluetooth link can be established with a known mobile terminal, the method is interrupted (step E4). It should be noted here that a known mobile terminal is a terminal for which the Bluetooth profile (for example its Bluetooth identifier) is already known and stored in the storage unit 14 of the electronic control unit 11.

Conversely, if a Bluetooth link is established with the mobile terminal 20, the electronic control unit 11 assumes that the user U is in the proximity of the motor vehicle 10, and the method is therefore continued.

Here, for reasons detailed below, provision is made for the mobile terminal 20 to make use of this Bluetooth link for transmitting to the electronic control unit 11 the derivation parameters DP (it will be recalled that these derivation parameters are used to calculate the virtual key VK on the basis of the root key $VK_0$ stored in the storage unit 14 of the electronic control unit 11).

An operation of authentication of the mobile terminal 20 by the electronic control unit 11 is also provided, during which operation the electronic control unit 11 interrogates the mobile terminal 20 to verify that the latter has a right of access to the motor vehicle 10.

This authentication operation could consist in verifying the Bluetooth profile of the mobile terminal 20 is already known and stored in the storage unit 14 of the electronic control unit 11. This authentication operation could therefore be performed in combination with the preceding step E3.

In this case, however, for greater security, this authentication operation is distinct from the preceding step E3. It then takes the form of a plurality of steps E5 to E14, for the purpose of verifying that the mobile terminal 20 carries a virtual key VK for access to the motor vehicle 10. These steps are as follows.

The first step E5 consists, for the electronic control unit 11, in generating a "challenge" (as it is known in English), for example a random number RND.

The electronic control unit 11 then calculates a response RESP associated with this challenge RND, by applying the cryptographic function f using the virtual key VK (step E6), which may be written thus:

$$RESP=f(RND,VK).$$

This is because, the electronic control unit 11 is capable of calculating the virtual key VK in advance, since it has the root key $VK_0$ in memory and has received the derivation parameters DR The electronic control unit 11 of the motor vehicle then sends the challenge RND to the mobile terminal 20, by means of the established Bluetooth link (step E7).

The mobile terminal 20 receives the challenge RND (step E8), and then calculates, in turn, the expected response RESP' by applying the cryptographic function f to the challenge RND received (step 9), which may be written thus:

$$RESP'=f(RND,VK).$$

In step E10, the mobile terminal 20 returns this expected response RESP' to the electronic control unit 11, by means of the Bluetooth link.

The electronic control unit 11 of the motor vehicle 10 then receives this expected response RESP' (step 11) and compares it with the response RESP, verifying whether these two responses are identical (step 12).

If the equality is not verified, the electronic control unit 11 terminates the authentication process (step E13). This is because this means that the virtual key VK used by the mobile terminal 20 differs from that used by the electronic control unit 11. An error message may then, for example, be displayed on the screen of the mobile terminal 20.

If the equality is verified, the electronic control unit 11 validates the authentication of the mobile terminal 20 (step E14), and the control method may then continue.

In the next step E15, the electronic control unit 11 sends the interrogation message IM to the mobile terminal 20, so that a message may be displayed on the touch screen 29 of the mobile terminal 20 (step E16).

This interrogation message IM will be created in such a way that it can be interpreted by the user application stored in the memory 24 of the mobile terminal 20, so that this user application can cause a "pop-up" window (as it is known in English) or a notification (information appearing in the form of an icon in the notification bar) to be displayed on the touch screen 29.

The user application will be programmed so that this pop-up window or notification causes the appearance, on the one hand, of a message asking the user if he wishes to unlock the doors of his vehicle, and, on the other hand, of two buttons enabling him to accept or refuse. Alternatively, the notification may cause the appearance of buttons asking the user which function he wishes to execute (for example, unlocking the doors, unlocking the trunk, activating the warning device, etc.).

Preferably, the user application also causes, on reception of the interrogation message IM, the emission of a sound or of a vibration perceptible to the user, to attract the attention of the latter.

When one or other of the buttons has been pressed (step E17), a response message is returned by the mobile terminal 20 to the electronic control unit 11, also via a Bluetooth link (step E18).

This response message will be created in such a way that it can be interpreted by the electronic control unit 11 as a validation message VM if the user has validated the request, or as an invalidation message in the contrary case.

Having received this response message (step E19), the electronic control unit 11 processes it as follows.

If the message is a validation message VM, it sends a door unlocking signal to the actuator 15 (step E20).

However, if the message is an invalidation message, the process is interrupted (step E21).

If the electronic control unit 11 has received no response message from the mobile terminal 20 after a predetermined time interval (for example 10 seconds), it also interrupts the process. In a variant, provision may be made for it to re-attempt the transmission of an interrogation message to the mobile terminal 20.

The present invention is in no way limited to the embodiment described and represented.

In particular, the user may be required to act in a different way to validate the interrogation message received on his mobile terminal. By way of example, he may validate this message by simply unlocking his mobile terminal, or by drawing a predetermined shape on the screen of his mobile terminal with his finger (which will prevent any person who has stolen the mobile terminal from validating the message).

According to another variant embodiment of the invention, provision may be made for the mobile terminal and the electronic control unit to communicate with one another via a public network, for example via the mobile telephony network (instead of via Bluetooth). In this variant, the protocol used is of a long range type, making it impossible to execute step E3 which consists in verifying that the mobile terminal is located in the proximity of the motor vehicle. In this variant, if it is desired to execute this step E3, other means installed in the mobile terminal must be used, for example its GPS chip, if one is installed.

In yet another variant, the function of the motor vehicle to which access is to be controlled may be the starting of the engine of the motor vehicle. In this variant, the action step may consist, for the user, in pressing the starter button of the motor vehicle. However, the other steps will be identical to those described above. This variant will be particularly advantageous where it is applied to a soft-top (or "convertible") vehicle.

In the embodiment described above with reference to FIGS. 1 to 3, the mobile terminal was therefore a cellphone equipped with a display screen. The interrogation message IM was then directly transmitted by the electronic control unit 11 to the cellphone in such a way that a message was displayed on the display screen of the cellphone, and the validation message VM was directly transmitted by the cellphone to the electronic control unit 11 via a Bluetooth link.

In another embodiment, provision could be made for the mobile terminal to be a mobile watch equipped with a display screen. The term "mobile watch" is taken to mean a watch capable of communicating with other devices (notably with the electronic control unit 11), independently of a cellphone, for example via a Bluetooth link.

In this embodiment, the interrogation message IM may be directly transmitted by the electronic control unit 11 to the mobile watch, and the validation message VM may be directly transmitted by the mobile watch to the electronic control unit 11.

In yet another embodiment, provision could be made for the mobile terminal to be a cellphone adapted to communicate with a connected watch carried by the carrier of the cellphone. The term "connected watch" is taken to mean a watch capable of communicating with the cellphone and which, in order to communicate with other devices (notably with the electronic control unit 11), must necessarily establish a gateway, at least momentarily, by means of the cellphone.

In this embodiment, the interrogation message IM may be transmitted by the electronic control unit 11 to the connected watch via the cellphone. However, the validation message VM may either be directly transmitted by the connected watch to the electronic control unit 11, or be transmitted to it via the cellphone.

The invention claimed is:

1. A method for controlling access to at least one function of a motor vehicle, comprising:
    detecting, by an electronic control unit on board the motor vehicle, an interaction of a user with the motor vehicle;
    verifying, by the electronic control unit, that the user is authorized to access said function; and
    when the interaction is detected by the electronic control unit and the electronic control unit has verified that the user is authorized to access said function, authorizing, by the electronic control unit, access to said function,
    wherein verifying comprises sending, by said electronic control unit, an interrogation message (IM) to a mobile terminal carried by the user or by a person accompanying the user, and
    wherein authorizing access to said function is executed only when the electronic control unit receives an access right validation message (VM) from the mobile terminal in response to the interrogation message (IM).

2. The control method as claimed in claim 1, wherein, before the interrogation message (IM) is sent, authentication of the mobile terminal by the electronic control unit is provided, during which the electronic control unit interrogates the mobile terminal to verify that the mobile terminal carries a virtual key (VK) for access to the motor vehicle, and/or to verify that the mobile terminal is recorded in the electronic control unit as having a right to access the motor vehicle.

3. The control method as claimed in claim 1, wherein, before the interrogation message (IM) is sent, a check is performed, during which the electronic control unit checks whether the mobile terminal is located at a short or medium distance from the motor vehicle.

4. The control method as claimed in claim 3, wherein, during the check, the mobile terminal is a short or medium distance from the motor vehicle when the electronic control unit detects the mobile terminal via a means of communication that operates using a medium or short range communications protocol.

5. The control method as claimed in claim 4, wherein the interrogation message (IM) and the validation message (VM) are exchanged between the mobile terminal and the electronic control unit via the means of communication configured to use the medium or short range communications protocol.

6. The control method as claimed in claim 4, wherein the electronic control unit detects the entry of the mobile terminal into an area close to the motor vehicle, in which the mobile terminal and the electronic control unit are capable of communicating with one another via the means of communication configured to use the medium or short range communications protocol.

7. The control method as claimed in claim 4, wherein said communications protocol is Bluetooth.

8. The control method as claimed in claim 1, wherein the electronic control unit detects a pressure exerted by the user on a part of the motor vehicle.

9. The control method as claimed in claim 1, wherein, on receiving the interrogation message (IM), the mobile terminal emits a sound or generates a vibration perceptible to said user or to said person accompanying the user.

10. The control method as claimed in claim 1, wherein authorizing comprises the transmission by said electronic control unit of a door unlocking signal or a vehicle starting signal.

11. The control method as claimed in claim 1, wherein, said mobile terminal is a cell phone equipped with a display screen, and:
    during said verifying, said interrogation message (IM) is directly transmitted by the electronic control unit to the cell phone so that a message is displayed on the display screen of the cell phone, and
    during said authorizing, said validation message (VM) is directly transmitted by the cell phone to the electronic control unit.

12. The control method as claimed in claim 1, wherein, said mobile terminal is a mobile watch equipped with a display screen:
    during said verifying, said interrogation message (IM) is directly transmitted by the electronic control unit to the mobile watch so that a message is displayed on the display screen of the mobile watch, and
    during said authorizing, said validation message (VM) is directly transmitted by the mobile watch to the electronic control unit.

13. The control method as claimed in claim 1, wherein, said mobile terminal is a cell phone capable of communicating with a connected watch equipped with a display screen, during said verifying said interrogation message (IM) is transmitted by the electronic control unit to said connected watch via the cell phone so that a message is displayed on the display screen of the connected watch.

14. The control method as claimed in claim 13, wherein, during said authorizing, said validation message (VM) is directly transmitted by the connected watch to the electronic control unit.

15. The control method as claimed in claim 13, wherein, during said authorizing, said validation message (VM) is transmitted by the connected watch to the electronic control unit via the cellphone.

* * * * *